US010053377B2

(12) United States Patent  (10) Patent No.: US 10,053,377 B2
Ono  (45) Date of Patent: Aug. 21, 2018

(54) WATER SOFTENING DEVICE FOR USE FOR A PET

(71) Applicant: Etec Inc., Tokyo (JP)

(72) Inventor: Shiro Ono, Tokyo (JP)

(73) Assignee: Etec Inc., Tokyo (JP)

( * ) Notice: Subject to any disclaimer, the term of this patent is extended or adjusted under 35 U.S.C. 154(b) by 324 days.

(21) Appl. No.: 14/990,081

(22) Filed: Jan. 7, 2016

(65) Prior Publication Data

US 2017/0036925 A1    Feb. 9, 2017

(30) Foreign Application Priority Data

Aug. 7, 2015  (JP) ................. 2015-004017

(51) Int. Cl.
*C02F 1/42* (2006.01)
*C02F 1/28* (2006.01)
*C02F 1/00* (2006.01)
*B01D 15/36* (2006.01)
*B01D 24/00* (2006.01)
(Continued)

(52) U.S. Cl.
CPC .............. *C02F 1/42* (2013.01); *B01D 15/362* (2013.01); *B01D 24/004* (2013.01); *B01D 24/008* (2013.01); *B01D 24/12* (2013.01); *C02F 1/003* (2013.01); *C02F 1/283* (2013.01); *B01J 47/012* (2017.01); *B01J 47/024* (2013.01); *C02F 2001/425* (2013.01); *C02F 2101/10* (2013.01); *C02F 2201/006* (2013.01); *C02F 2307/04* (2013.01)

(58) Field of Classification Search
CPC .. C02F 1/003; C02F 1/283; C02F 1/42; C02F 2001/425; C02F 2201/006; C02F 2307/04; B01D 24/004; B01D 24/008; B01D 24/12; B01J 47/012; B01J 47/024
See application file for complete search history.

(56) References Cited

U.S. PATENT DOCUMENTS 1,872,771 A * 8/1932 Little ..................... B65D 83/00
                                                                220/740
5,082,568 A * 1/1992 Holler .................... B01J 47/024
                                                                210/679
(Continued)

FOREIGN PATENT DOCUMENTS

JP        2006-833 A     1/2006
JP     2008-272693 A    11/2008
JP     2009-131768 A     6/2009

*Primary Examiner* — Matthew O Savage
(74) *Attorney, Agent, or Firm* — LambentIP

(57) ABSTRACT

A water softening device for use for a pet is provided, comprising: a first chamber having a shape of a hollow container; a second chamber having a shape of a hollow container, the second chamber being detachably attached to an upper section inside the first chamber; and a filter cartridge having a plurality of openings and containing an ion exchange resin therein, the filter cartridge being detachably attached to a bottom section of the second chamber and positioned to protrude from the bottom section of the second chamber to a lower section inside the first chamber. The second chamber is configured to receive and contain first water including tap water, and the lower section inside the first chamber is configured to receive and contain second water that is the first water after passing through the filter cartridge based on gravity.

11 Claims, 4 Drawing Sheets

(51) Int. Cl.
*B01D 24/12* (2006.01)
C02F 101/10 (2006.01)
*B01J 47/012* (2017.01)
*B01J 47/024* (2017.01)

(56) References Cited

U.S. PATENT DOCUMENTS

| | | | | |
|---|---|---|---|---|
| 5,637,214 | A * | 6/1997 | Kahana | A47J 31/605 |
| | | | | 210/282 |
| 6,103,114 | A * | 8/2000 | Tanner | C02F 1/003 |
| | | | | 210/232 |
| 6,524,477 | B1 * | 2/2003 | Hughes | C02F 1/003 |
| | | | | 210/282 |
| 8,097,159 | B1 | 1/2012 | Peng | |
| 2002/0193453 | A1 * | 12/2002 | Bohling | B01J 39/20 |
| | | | | 521/26 |
| 2004/0060873 | A1 * | 4/2004 | Yanou | B01D 61/16 |
| | | | | 210/660 |
| 2005/0115879 | A1 | 6/2005 | Kochergin et al. | |
| 2006/0000763 | A1 * | 1/2006 | Rinker | C02F 1/003 |
| | | | | 210/282 |
| 2013/0092090 | A1 | 4/2013 | McCallum | |
| 2014/0138321 | A1 | 5/2014 | Koch | |

* cited by examiner

WATER SOFTENING DEVICE FOR USE FOR A PET

CROSS REFERENCE TO RELATED APPLICATIONS

This application claims priority from Japanese Utility Model Application Serial No. 2015-004017, filed on Aug. 7, 2015, which issued on Sep. 30, 2015 as Japanese Utility Model Registration No. 3200546.

BACKGROUND

Dogs, cats, and humans alike can suffer from urinary calculi or stones, a dreaded buildup of irritating substances in the urinary tract that causes pain and even obstruction. Urolithiasis refers to calcifications that form in the urinary system, primarily in the kidney (nephrolithiasis) or ureter (ureterolithiasis), and may also form in or migrate into the lower urinary system (bladder or urethra). The onset of these diseases is when the amount of minerals present in the urine is high enough that the minerals are unable to remain dissolved. Thus, prevention measures include proper diets to reduce the intake of such problem-causing minerals.

Water described as "hard" is high in dissolved minerals, specifically calcium and magnesium. Water supplied as tap water is hard or soft depending on regions, and hard water is normally harmless to humans. However, calcium and magnesium content in generally supplied hard water can be too high for pets, whose bodies are smaller than humans, potentially leading to formation of urinary calculi or stones.

Systems and methods for water softening have been developed primarily for generating high-quality drinking water for humans. In particular, conventional technologies involve large scale systems to generate filtered water at the water source or complex devices including filter-regenerating functions. In view of the lack of developments targeted for use for dogs, cats and other small animals, this document provides a water softening device, which is portable, easy to handle and specifically tailored to generate soft water suitable for pets.

DETAILED DESCRIPTION

Figure 1:
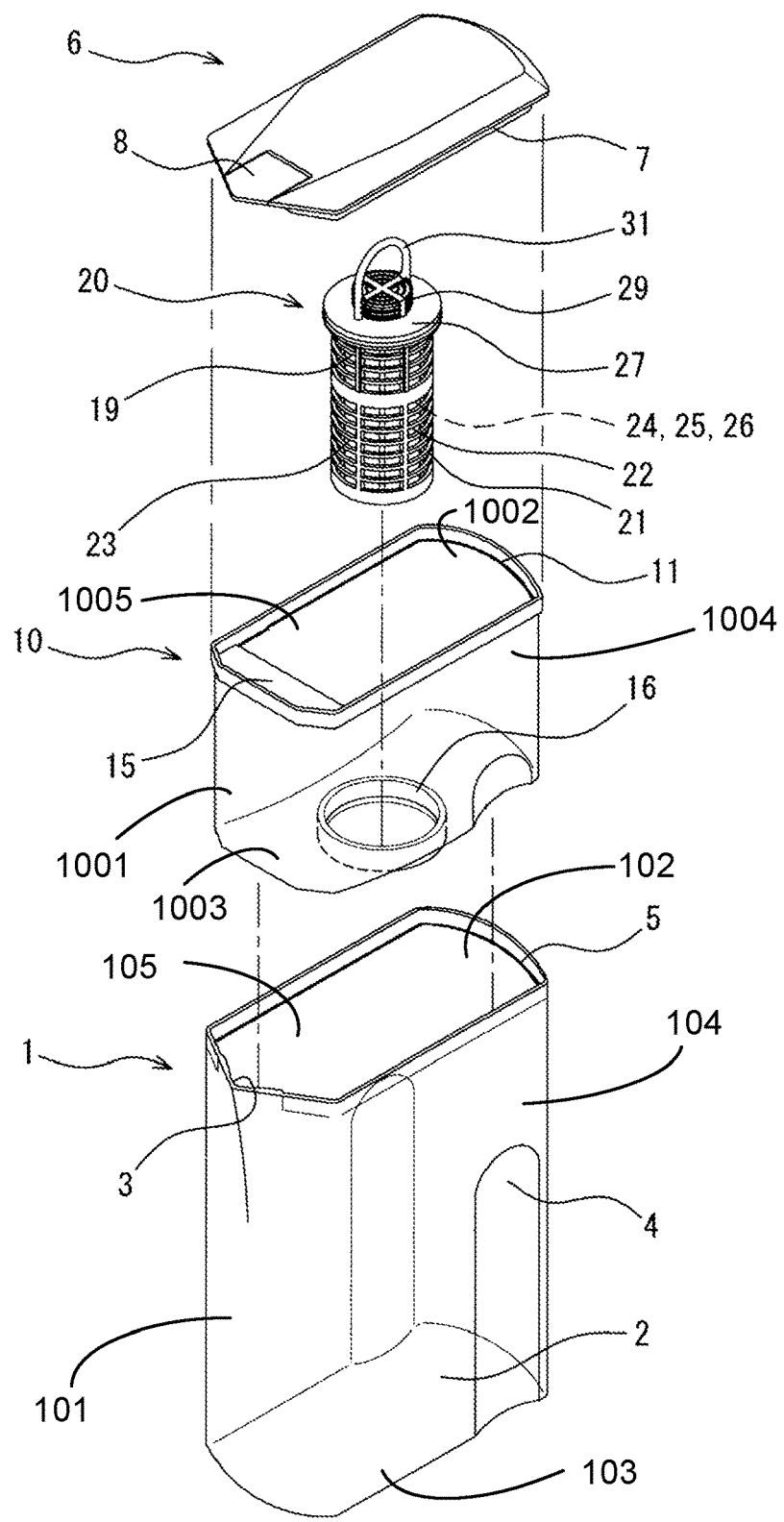
FIGS. 1-3 illustrate an exploded perspective view, a vertical cross-sectional view and a top plan view, respectively, of an example of a water softening device for generating and containing soft water according to an embodiment.
Figure 2:
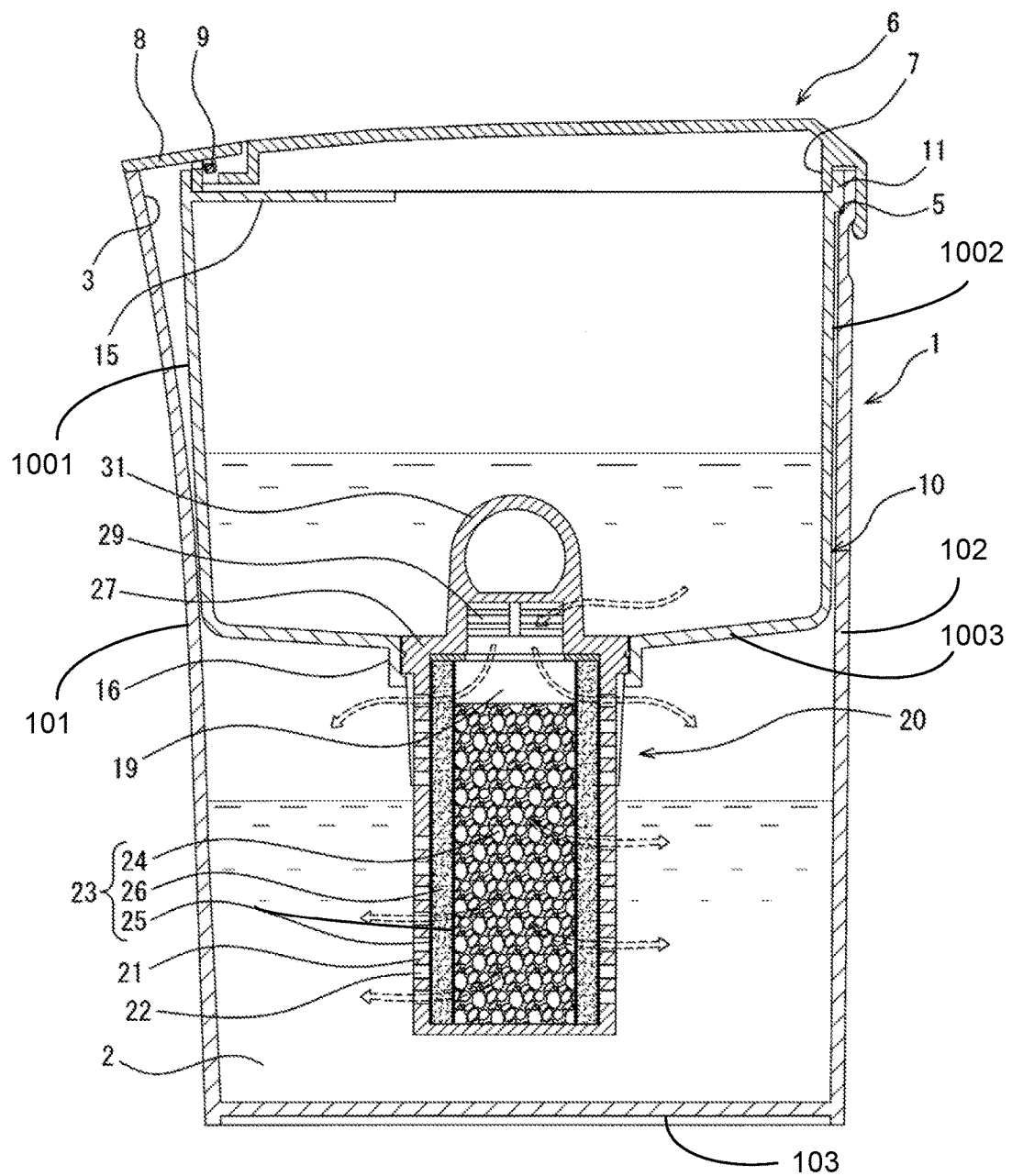
Figure 3:
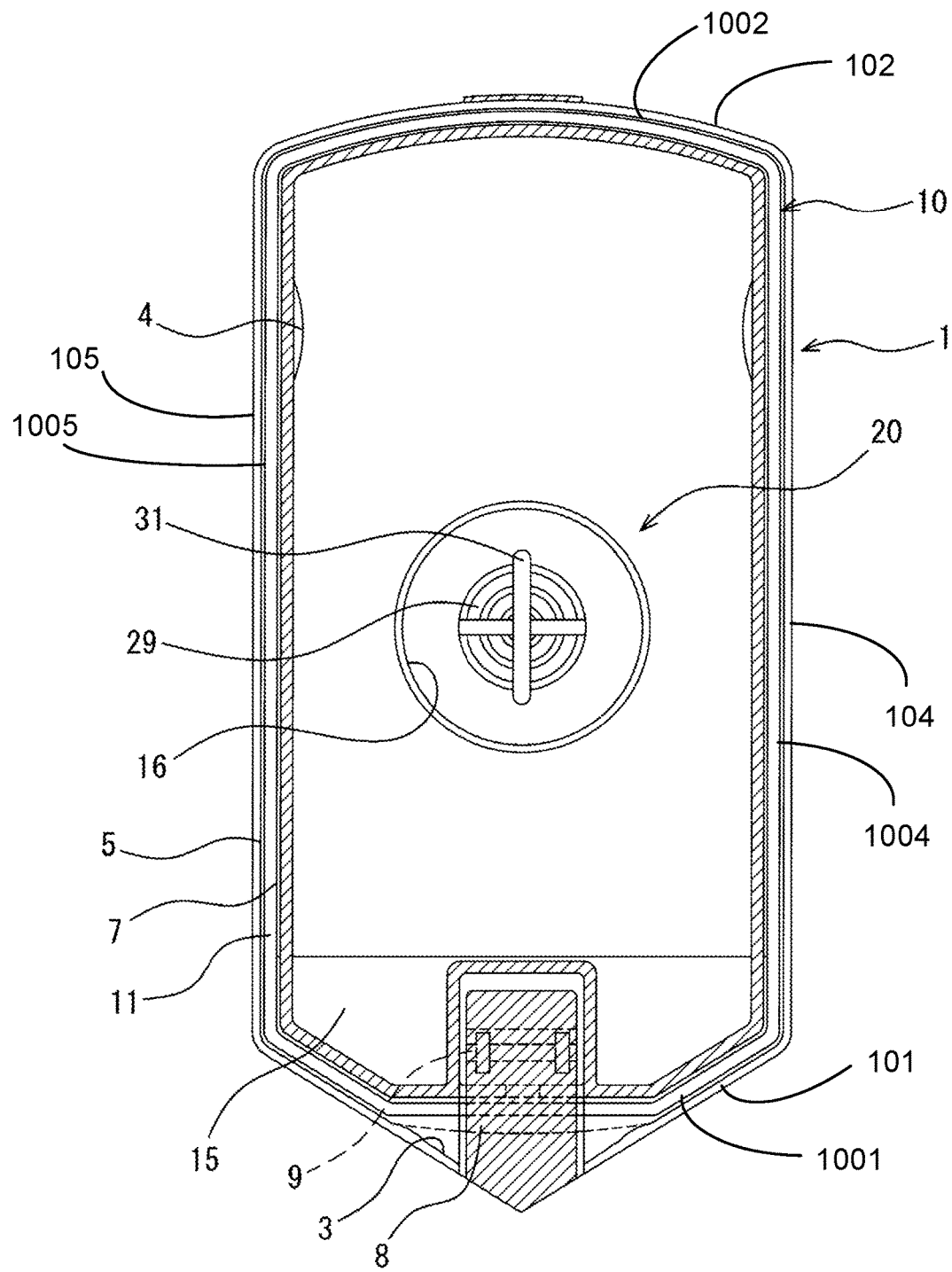
Figure 4:
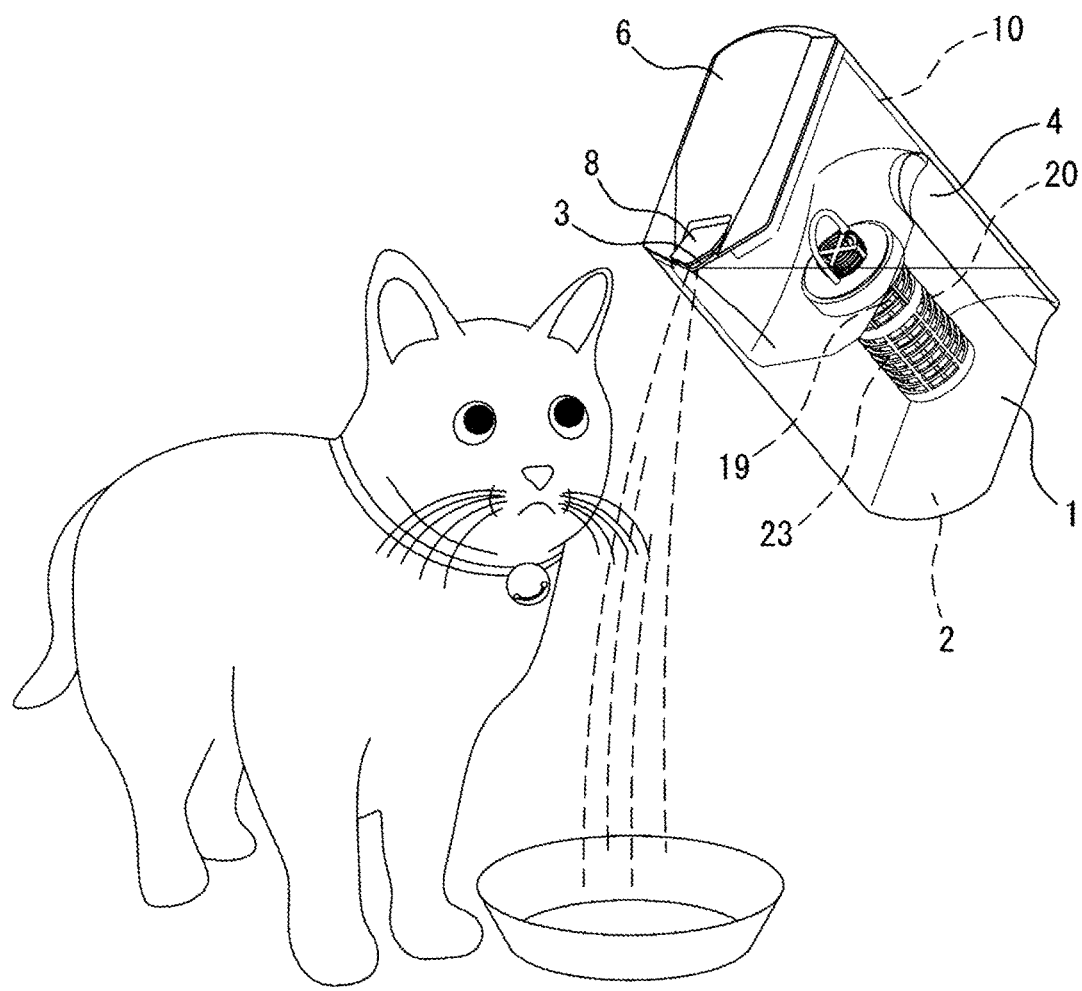
FIG. 4 schematically illustrates a scene wherein the softened water is poured out into a water dish for a pet to drink.

FIGS. 1-3 illustrate an exploded perspective view, a vertical cross-sectional view and a top plan view, respectively, of an example of a water softening device for generating and containing soft water according to an embodiment. The water softening device in this example includes a first chamber 1 having a shape of a hollow container with an open top and configured to accommodate various parts necessary for softening water. A second chamber 10 is detachably attached to the upper section inside the first chamber 1, and also has a shape of a hollow container with an open top. The volume of the second chamber 10 is configured to be sufficient to receive and contain a predetermined amount of first water, which can be tap water. The volume of the lower section 2 of the first chamber 1 is configured to be sufficient to receive and contain a predetermined amount of second water, which is water after softening. The first chamber 1 and the second chamber 10 may be made of a transparent material, such as a plastic, so as to enable a user, e.g., a pet owner, to observe the water amounts therein. FIG. 4 schematically illustrates a scene wherein the second water is poured out into a water dish for a pet to drink.

The overall shape of the first chamber 1 may be a generally hollow cuboid, having a front section 101, a back section 102, a bottom section 103 and two side sections 104 and 105, forming an opening at the top. In this example, the width of the two side sections 104 and 105 is larger than the widths of the front and back sections 101 and 102, so as to enable the user to grab hold of portions of the back section 102 and the two side sections 104 and 105 using one hand to pour out the second water. As depicted in the example in FIGS. 1-4, a gradual projection is formed at the top end portion of the front section 101 to form a spout 3 for pouring out the second water. In order to enable an easy hold of the first chamber 1, a pair of grooves 4 may be formed on the side sections 104 and 105 closer to the back section 102 than to the front section 101.

The second chamber 10 is configured to be detachably attached to the upper section inside the first chamber 1. Namely, the second chamber can be attached to and detached from the upper section inside the first chamber 1. Similar to the chamber 1, the overall shape of the second chamber 10 may be a generally hollow cuboid, having a front section 1001, a back section 1002, a bottom section 1003, two side sections 1004 and 1005, forming an opening at the top. The width of the two side sections 1004 and 1005 may be larger than the widths of the front and back sections 1001 and 1002. In this example, the front section 1001 of the second chamber 10 is configured to be recessed from the front section 101 of the first chamber 1 when attached, so that there is a gap between the projection including the spout 3 at the top end portion of the first chamber 1 and the front section 1001 of the second chamber 10, the gap being sufficient to provide a channel for the second water to pass through from the lower section 2 inside the first chamber 1 to the spout 3, when the water softening device is tilted forward by the user holding the portions of the back section 102 and the two side sections 104 and 105 of the chamber 1 using one hand. The inside of the top end portion of the first chamber 1, except for the spout 3, may be configured to have a supporting rim 5; and the outside of the top end portion of the second chamber 10, expect for the recessed area of the front section 1001 of the second chamber 10, may be configured to have a flange 11. With this configuration, the second chamber 10 can be easily attached to or detached from the first chamber 1 by engaging the flange 11 with the supporting rim 5 or disengaging the flange 11 from the supporting rim 5. When these two chambers 1 and 10 are attached, the upper section of the water softening device is double-layered by the chambers 1 and 10.

The water softening device may include a lid 6 for covering the top opening of the second chamber 10. The lid 6 may include a locking member 7 that is configured to engage with and disengage from, by pushing and pulling, respectively, a combination of a portion of the back section 104 of the first chamber 1 and a portion of the back section 1004 of the second chamber 10, above the supporting rim 5 and the flange 11. The lid 6 may further include a flap 8 hinged therewith via a hinging element 9, providing a simple one-way valve function for allowing the second water to come out from the spout 3 when the water softening device is tilted forward and the water pushes out the flap 8. The second chamber 10 may include a shield plate 15 formed contiguous to the front section 1001 and substantially horizontal to cover a front part of the top opening of the second chamber 10. The shield plate 15 serves to block the first water contained in the second chamber 10 from pouring out when the device is tilted forward to pour out the second water from the lower section 2 inside the first chamber 1 through the spout 3.

A generally round opening is formed approximately at the center of the bottom section 1003 of the second chamber 10. A cartridge support member 16 may be formed along the rim of the bottom opening and configured to hold and support a filter cartridge 20. In this example, the filter cartridge 20 includes a cartridge body 21, which has a shape of a substantially hollow cylinder with a bottom section and a side section in which a plurality of openings 22 are formed. The plurality of openings 22 of the cartridge body 21 are configured to channel the first water based on gravity from the inside of the filter cartridge 20 to the outside, i.e., to the lower section 2 inside the first chamber 1. The cartridge body 21 is configured to include a filter unit 23. The filter unit 23 includes a first layer 24 comprising an ion exchange resin, which is cylindrically surrounded by a second layer 26 comprising activated carbon. In this example, the filter unit 23 further includes a nonwoven fabric material 25, which is configured to form a first sheet cylindrically placed to cover the inner side surface of the second layer 26. Furthermore, a second sheet of the nonwoven fabric material 25 is cylindrically placed to cover the outer side surface of the second layer 26. Note that the vertical height of the first layer 24 comprising the iron exchange resin is configured to be lower than the vertical height of the second layer 26 comprising the activated carbon, providing a passage 19 that allows part of the first water to flow directly through the second layer 26, instead of going through the first layer 24 first and then through the second layer 26.

The filter cartridge 20 further includes a cartridge top 27, the circumference of which includes a portion having a flange shape to engage with the cartridge support member 16 surrounding the opening formed in the bottom section 1003 of the second chamber 10. Thus, when the filter cartridge 20 is inserted through the bottom opening of the second chamber 10, the circumference of the cartridge top 27 engages with the cartridge support member 16 so as to be held and supported, whereby the filter cartridge 20 is positioned to protrude from the bottom section 1003 of the second chamber 10 to the lower section 2 inside the first chamber 1. The cartridge top 27 further includes a water guide section 29, which includes a plurality of openings to channel the first water based on gravity from the second chamber 10 to the inside of the filter cartridge 20 toward the filter unit 23. The cartridge top 27 may further include a handle 31, which is formed to have a generally ring shape in this example. The handle 31 is provided for use for holding, enabling the user to replace the entire filter cartridge 20 including the filter unit 23.

The first water, which is the original tap water initially contained in the second chamber 10, can pass through the filter cartridge 20 by gravity to the lower section 2 inside the first chamber 1, where the second water, i.e., the softened water after going through the filter cartridge 20, is received and contained. Therefore, based on the present configuration, the first and second water, i.e., the original tap water and the filtered softened water, are separated without mixing. The filtering capability generally lowers after a certain period of time. The filter cartridge 20 may be replaceable, in that the entire filter cartridge 20, including the cartridge body 21, the filter unit 23 and the cartridge top 27, can be replaced with a new one. Alternatively, the cartridge body 21 and the cartridge top 27 may be configured to be detachably attached, so that the user can detach them from each other to replace the old filter unit 23 with a new one.

As illustrated in FIG. 2, the filter unit 23 includes two filter members, the first layer 24 comprising an ion exchange resin and the second layer 26 comprising active carbon. First, the first water, e.g., the original tap water, passes through the water guide section 29 having the plurality of openings, from the second chamber 10 to the inside of the filter cartridge 20 toward the filter unit 23. As mentioned earlier, the vertical height of the first layer 24 is configured to be lower than the vertical height of the second layer 26, providing the passage 19 that allows part of the water to flow directly through the second layer 26 comprising the activated carbon, instead of going through the first layer 24 first and then through the second layer 26. Therefore, a certain amount of the water passes through the first layer 24 first, then the second layer 26, and comes out through the plurality of opening 22 formed in the side section of the cartridge body 21, to the lower section 2 inside the first chamber 1. Thus, the second water that has gone through the filtering along this path has a reduced amount of minerals, elements and materials, in particular, the reduced magnesium and calcium ions. The other part of the water passes through only the second layer 26 comprising the activated carbon, and comes out through the plurality of opening 22 formed in the side section of the cartridge body 21, to the lower section 2 inside the first chamber 1, whereby the second water that has gone through the filtering along this path maintains roughly the same amount of the magnesium and calcium ions as the first water. The volume of the passage 19 may be configured to be in the range between 1-20% of the entire volume in the filter body 21 so that excessive removal of the magnesium and calcium ions can be avoided. Together with adjusting the amount of the ion exchange resin in relation to the amount of water, adjusting the volume of the passage 19 allows to maintain the taste and flavor of the water at a desired level, while reducing the amount of the magnesium and calcium ions to a desired level, and while removing other undesirable elements and materials by the activated carbon in the second layer 26.

An example process of using the present water softening device is summarized below. First, a user, e.g. a pet owner, opens or removes the lid 6 and pours first water such as tap water into the second chamber 10. The first water passes through, based on gravity, the filter unit 23 in the filter body 21, whereby the magnesium and calcium ions as well as the free residual chlorine and other unwanted elements and materials present in the first water are reduced. The resultant water, i.e., the second water, is received and contained in the lower section 2 inside the first chamber 1. The user can grab hold of portions of the back section 102 and the two side sections 104 and 105 of the first chamber 1 using one hand by making use of a pair of grooves 4 formed on the side sections 104 and 105. The user can then tilt forward the water softening device to pour out the second water contained in the lower section 2 inside the first chamber 1 through the spout 3 by letting the water push open the hinged flap 8. The filtering capability will deteriorate after repetitive use. The user can then replace the entire filter cartridge 20, or separate the cartridge body 21 and the cartridge top 27 to replace the filter unit 23 only.

The second layer 26 comprises active carbon with the water filtering capability conforming to official regulations such as JIS 13 items. Examples of elements and materials, which such active carbon can remove from water, include: free residual chlorine, 2-methylisoborneol (MIB) that is a cause of a musty or earthy odor, trihalomethanes (THMs) including chloroform, bromodichloromethane, dibromochloromethane, bromoform and the like, agricultural chemicals, tetrachloroethylene, trichloroethylene, soluble lead, 1,1,1-trichloroethane, and the like. Ferric oxide (red rust) can also be removed. This is especially beneficial for pets with deteriorated kidney functions.

The first layer 24 comprises an ion exchange resin in the form of beads in this example. Ion exchange resins are typically polymers that are capable of exchanging particular ions within the polymer with ions in a solution that come in contact with them. In water softening applications, $Na^+$-based or $H^+$-based ion exchange resins are typically used to reduce the mineral content, in particular, the magnesium and calcium ions, found in hard water. For the case of a $Na^+$-based ion exchange resin, when the resin is fresh, it contains sodium ions at its active sites. As the water passes through the resin, the resin takes up magnesium and calcium ions to its active sites, and releases $Na^+$ ions in the water, thereby softening the water. The resin can be recharged by washing it with salt water. The similar ion exchange mechanism can be carried out by using an $H^+$-based ion exchange resin, except that an $H^+$-based ion exchange resin is typically not rechargeable. The ion exchange resin in the first layer 24 may be $Na^+$-based or $H^+$-based. However, it is preferable to use an $H^+$-based ion exchange resin for drinking water. This is because the released $Na^+$ ions in the water inevitably increases the $Na^+$ ion content, thereby making it less suitable for drinking water for a pet. By using an $H^+$-based ion exchange resin, $H^+$ ions get released in the water in exchange of the minerals including magnesium and calcium ions. $H^+$ ions are generally harmless for a pet.

Water hardness is a measure of the concentration of mineral content, in particular, $Ca^{2+}$ and $Mg^{2+}$ ions in water, which can be readily measured by using an off-the-shelf measurement device. In general, water hardness is expressed in various units, such as a molar concentration, ppm, mg/L, etc. The unit of mg/L is used herein, where L=liter=1000 $cm^3$. Water hardness of tap water differs from region to region; for example, it is about 30 in New York, 55 in San Francisco and in most areas of Japan, 90 in Los Angeles, 130 in Chicago, and 300 in Las Vegas and San Diego. The amount of ion exchange resin in the form of beads included in the present water softening device can be predetermined in relation to the amount of water to be softened and the degree of softness to be achieved. Empirical relationships among relevant parameter values are explained below. Although specific numbers are cited herein to explain such relationships and metrics as examples, it should be understood that these are approximate values. The water softening rate, i.e., the hardness reduction, is 100% when the original water hardness of 50 is reduced to 0, and it is 50% when the original water hardness of 50 is reduced to 25. Obviously, there is a trade-off relationship between the amount of water that can be softened and the degree of hardness reduction. Table 1 below lists examples showing the relationships between the amount of water that can be softened and the degree of hardness reduction by using different amounts of the ion exchange resin.

TABLE 1

| Iron Exchange Resin (g) | Water Softened (L) | Hardness Reduction (Δ) | Hardness Reduction (Water Softening Rate, %) | Water Softened (L) x Hardness Reduction (Δ) | Number of Days with Drinking Rate of 0.5 L per Day |
|---|---|---|---|---|---|
| 100 | 100 | 50 → 0 | 100% | 5000 | 200 |
| 100 | 50 | 100 → 0 | 100% | 5000 | 100 |
| 100 | 60 | 100 → 20 | 80% | 5000 | 120 |
| 40 | 100 | 50 → 30 | 40% | 2000 | 200 |
| 40 | 80 | 50 → 25 | 50% | 2000 | 160 |
| 40 | 60 | 50 → 15 | 70% | 2000 | 120 |
| 40 | 50 | 50 → 10 | 80% | 2000 | 100 |
| 40 | 40 | 50 → 0 | 100% | 2000 | 80 |
| 40 | 40 | 100 → 50 | 50% | 2000 | 80 |
| 40 | 30 | 100 → 30 | 70% | 2000 | 60 |
| 40 | 25 | 100 → 20 | 80% | 2000 | 50 |
| 40 | 10 | 300 → 90 | 70% | 2000 | 20 |

As exemplified in Table 1, for the case of a typical ion exchange resin in the form of beads, 100 g of it can reduce the hardness of 100 L of water, which originally had the hardness of 50, to zero; and 100 g of it can reduce the hardness of SOL of water, which originally had the hardness of 100, to zero. These are the cases for the water softening rate of 100%. By using 40 g of the ion exchange resin with the water softening rate of 100%, the hardness of 40 L of water, which originally had the hardness of 50, can be reduced to 0. By using 40 g of the ion exchange resin, 80 L of water can be softened with the water softening rate of 50% (reduction of the hardness from 50 to 25, for example). Similarly, by using 40 g of the ion exchange resin, about 60 L of water can be softened with the water softening rate of 70% (reduction of the hardness from 50 to 15, for example). Typically, a dog, a cat or other small animal needs about 0.5 L of water per day; thus, 60 L of the soft water (reduced from 50 to 15, for example) gets consumed after 120 days, and 80 L of the soft water (reduced from 50 to 25, for example) gets consumed after 160 days. The rightmost column in Table 1 lists the number of days it takes for the corresponding amount of softened water to be consumed, assuming that the pet drinks 0.5 L per day.

Experiments suggested that excessive removal of the mineral content can degrade the taste and flavor of the water, and may even cause mineral deficiency. Thus, the hardness reduction, i.e., the water softening rate, should not be excessive, and yet the concentration of $Ca^{2+}$ and $Mg^{2+}$ ions should be reduced to a healthy level. Numerous experiments suggested that the concentration level of the $Ca^{2+}$ and $Mg^{2+}$ ions, which can maintain a small animal healthy (e.g., preventing urinary calculi or stones) and yet keep the taste and flavor of the water, corresponds to the water hardness level in the range of 10-30. This range corresponds to the water softening rate of roughly 40-80% for the water with the original hardness of 50 by using 40 g of the ion exchange resin. The empirical relationships, shown in bold face in Table 1, suggest that 40 g of the ion exchange resin can soften 50-100 L of water from the hardness level of 50 to the level in the range of 10-30, which lasts for 100-200 days, assuming that the pet drinks 0.5 L of the water per day. In the case when the water hardness level is reduced from 100 to 30, 40 g of the ion exchange resin can soften 30 L of water, which lasts for 60 days. Thus, the frequency of replacing the ion exchange resin is once in 2-7 months, which is a desirably long interval. On the other hand, a human needs about 2 L of water per day; thus, 50 L of softened water lasts for 25 days, whereby the frequency of replacing the ion exchange resin is less than a month, which may be relatively frequent and costly.

In the present water softening device, the amount of ion exchange resin in the first layer 24 and the overall volumes of the first and second chambers 1 and 10 are optimized for generating drinking water soft enough for a pet such as a dog, a cat and other small animal, and yet keeping the original taste and flavor. Such a small animal drinks about 0.5 L of water per day. Certain types of small cats drink even less, such as 0.2 L per day. Accordingly, the volumes of the first and second chambers 1 and 10 are optimized to handle at least the daily amount of drinking water for a pet. In particular, the lower section 2 inside the chamber 1, where the softened water is received and contained, is configured to have a volume in the range of 0.25 L-1.5 L. Accordingly, the volume of the second chamber 10 is configured to be in the range of 0.25 L-1.5 L, and thus the entire volume of the first chamber 1 is configured to be in the range of 0.5 L-3 L. The filter cartridge 20 needs to be situated so that the cartridge body 21 is protruded in the lower section 2 inside the first chamber 1, where the volume is relatively small when configured as above. Correspondingly, the amount of the ion exchange resin may be in the range of 30 g-60 g. Therefore, the present water softening device is configured as above based on the optimization considerations to generate softened water for a pet, such as a cat, a dog and other small animal.

It should be noted that in the regions where the water hardness is high, for example, 120 or higher, it takes more resin to lower the hardness to a desired level, requiring more volume for the cartridge body 21 to occupy in the lower section 2 inside the first chamber 1. Correspondingly, the overall size of the water softening device needs to be made larger, becoming too heavy and large to handle with one hand. Additionally or alternatively, the resin needs to be replaced frequently. For example, by using 40 g of the ion exchange resin, only 10 L of water can be softened from the hardness level of 300 to 90, as exemplified in Table 1, giving about 20 day supply of soft water for a pet. It should be noted that the ion exchange resin itself may not be capable of drastically reducing the water hardness. In the above example, the hardness reduction from 300 to 90 corresponds to the softening rate of 70%, but the resultant water is still as hard as 90. This means, in a region having the water hardness of 300, such as Las Vegas or San Diego, even by using the ion exchange resin with the water softening rate of 80%, the resultant hardness is still 60, which is not suitable for a pet. Thus, the present water softening device configured and optimized for a pet may be suited for use in regions where the original water hardness is less than 120.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A water softening device for use for a pet comprising:
a first container and a second container, each container having a shape of a generally hollow cuboid having a front wall, a back wall, a bottom wall and two side walls for containing water, and forming an opening at a top, wherein a width of the two side walls is larger than widths of the front and back walls, and wherein the second container is positioned in an upper portion of the first container for receiving and containing first water including tap water; and
a filter cartridge having a guide water section positioned in a bottom portion of the send container and a cartridge body positioned in a lower portion of the first container and below the second container, the guide water section having a plurality of openings and defining a flow path leading from an interior of the second container into the cartridge body, the cartridge body including a perforated cylindrical wall, an upper end of the cartridge body being connected to the guide water section and a lower end of the cartridge body being closed by a bottom wall, a cylindrical bed of cation exchange resin coaxially positioned within the perforated cylindrical wall, an annular layer of activated carbon positioned coaxially between the perforated cylindrical wall of the cartridge body and the cylindrical bed of cation exchange resin, wherein the annular layer of activated carbon extends from the bottom wall of the cartridge body to a top of the cartridge body, wherein a top of the cylindrical bed of cation exchange resin is positioned below a top end of the annular layer of activated carbon, wherein a cylindrical flow passage is formed within an upper end of the annular layer of activated carbon leading from the top of the cartridge body to an upper end of the cylindrical bed of cation exchange resin, wherein the first water flows from the guide water section and through the flow passage into the top of the cylindrical bed of cation exchange resin and radially outwardly through the annular layer of activated carbon and the perforated cylindrical wall of the cartridge body and into the first container to form a first portion of a second water that has been softened by the cation exchange resin and purified by the annular layer of activated carbon, and wherein the first water flows from the guide water section and through the cylindrical flow passage within the upper end of the annular layer of activated carbon and radially outwardly through the annular layer of activated carbon and the perforated cylindrical wall of the cartridge body to form a second portion of the second water that is purified only by the activated carbon, wherein a volume of the cylindrical flow passage within the upper end of the annular layer of activated carbon is 1% to 20% of an entire interior volume of the cartridge body whereby excessive removal of magnesium and calcium ions from the first water can be avoided.

2. The water softening device of 1, wherein
a gradual projection is formed at a top end portion of the front wall of the first container to form a spout for pouring out the second water from the first container.

3. The water softening device of 2, wherein
the front wall of the second container is configured to be recessed from the front wall of the first container when attached, to form a gap between the projection including the spout at the top end portion of the front wall of the first container and the front wall of the second container, the gap being sufficient to provide a channel for the second water to pass through from the lower portion of the first container to the spout when the water softening device is tilted forward.

4. The water softening device of claim 3, wherein the second container includes a shield plate formed contiguous to the front wall of the second container and substantially horizontal to cover a front part of the opening at the top of the second container, wherein the shield plate is configured to block the first water contained in the second container from pouring out when the water softening device is tilted forward to pour out the second water from the lower portion of the first container through the spout.

5. The water softening device of claim 3, further comprising:
a lid detachably attached to a combination of a portion of the back wall of the first container and a portion of the back wall of the second container, the lid including a flap hinged therewith, the flap providing a one-way valve function for allowing the second water to come out from the spout when the water softening device is tilted forward and the second water pushes out the flap.

6. The water softening device of 1, wherein a pair of grooves is formed on the two side walls of the first container closer to the back wall than to the front wall of the first container for use for holding the water softening device with one hand.

7. The water softening device of claim 1, wherein a generally round opening is formed in the bottom wall of the second container, and a cartridge support member is formed along a rim of the generally round opening to hold and support the filter cartridge.

8. The water softening device of claim 1, wherein the cartridge body further includes a first sheet of nonwoven fabric material covering an inner side surface of the annular layer of activated carbon and a second sheet of nonwoven fabric material covering an outer side surface of the annular layer of activated carbon.

9. The water softening device of claim 1, wherein a volume of the first container is in the range of 0.5 L-3 L, a volume of the second container is in the range of 0.25 L-1.5 L, and a volume of the lower portion of the first container and below the second container is in the range of 0.25 L-1.5 L.

10. The water softening device of claim 1, wherein an amount of the cation exchange resin is in the range of 30 g-60 g.

11. The water softening device of claim 1, wherein the cation exchange resin is in hydrogen form.

* * * * *